(12) United States Patent
Okita

(10) Patent No.: US 8,118,502 B2
(45) Date of Patent: Feb. 21, 2012

(54) CONTROL METHOD FOR LIGHT CONTROL APPARATUS, AND LIGHT CONTROL APPARATUS

(75) Inventor: Tatsuhiko Okita, Akiruno (JP)

(73) Assignee: Olympus Corporation, Tokyo (JP)

( * ) Notice: Subject to any disclaimer, the term of this patent is extended or adjusted under 35 U.S.C. 154(b) by 87 days.

(21) Appl. No.: 12/644,521

(22) Filed: Dec. 22, 2009

(65) Prior Publication Data

US 2010/0166416 A1 Jul. 1, 2010

(30) Foreign Application Priority Data

Dec. 25, 2008 (JP) ................................. 2008-330212

(51) Int. Cl.
*G03B 9/08* (2006.01)
(52) U.S. Cl. ........................ 396/449; 348/296
(58) Field of Classification Search .................. 396/449, 396/450, 452, 463; 348/296
See application file for complete search history.

(56) References Cited

U.S. PATENT DOCUMENTS

| 3,526,455 | A | * | 9/1970 | Barnette | 351/238 |
| 3,635,141 | A | * | 1/1972 | Starp et al. | 396/463 |
| 4,033,693 | A | * | 7/1977 | Payrhammer et al. | 355/71 |
| 4,088,405 | A | * | 5/1978 | Pustka et al. | 355/71 |
| 5,079,583 | A | * | 1/1992 | Sato et al. | 396/235 |
| 2007/0149681 | A1 | * | 6/2007 | Hamana et al. | 524/440 |

FOREIGN PATENT DOCUMENTS

JP 2007-025357 2/2007

* cited by examiner

*Primary Examiner* — Clayton E LaBalle
*Assistant Examiner* — Warren Fenwick
(74) *Attorney, Agent, or Firm* — Scully, Scott, Murphy & Presser, P.C.

(57) ABSTRACT

A method includes a drive step of causing a light control member from a first position to a second position and from the second position to the first position by a drive source, a detection step of detecting the position and state of the light control member, and a drive signal application step of applying a desired drive signal to the drive source in accordance with the position or state of the light control member detected in the detection step.

9 Claims, 12 Drawing Sheets

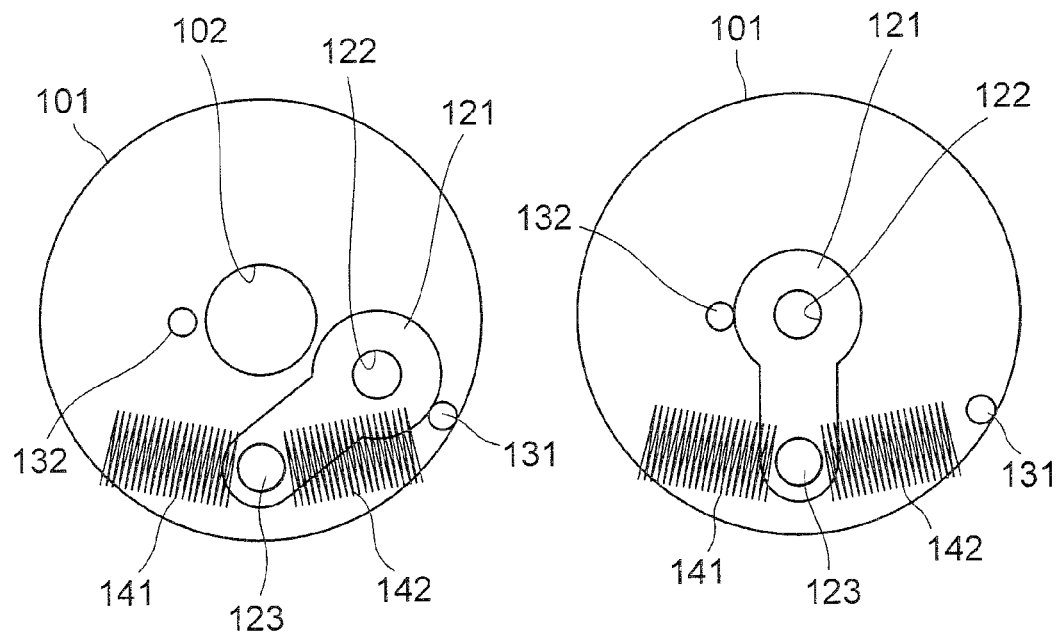

CONTROL METHOD FOR LIGHT CONTROL APPARATUS, AND LIGHT CONTROL APPARATUS

CROSS-REFERENCE TO RELATED APPLICATION

The present application is based upon and claims the benefit of priority from the prior Japanese Patent Application No. 2008-330212 filed on Dec. 25, 2008; the entire contents of which are incorporated herein by reference.

BACKGROUND OF THE INVENTION

1. Field of the Invention

The present invention relates to a control method for a light control apparatus and to a light control apparatus.

2. Description of the Related Art

With sophistication of portable devices having an image pickup function and small-size optical apparatuses such as micro videoscopes in recent years, there are demands for improvements of the optical components such as lenses and stops used therein. Specifically, there are increasing demands for replacement of conventional fixed focal length lenses and fixed aperture stop respectively with adjustable focus lenses and variable stops. Furthermore, stable operations of the optical components, not to mention to further size reduction and power saving, are desired.

FIG. 12A is a graph showing changes in the quantity of light with time in a conventional light control apparatus, and FIG. 12B is a graph showing changes in the drive current with time in the conventional light control apparatus. In a prior art light control apparatus described in Japanese Patent Application Laid-Open No. 2007-25357, a control method with which re-exposure due to bouncing of the shutter after it is fully closed is prevented from occurring while allowing high speed shutter operations. In this light control apparatus, furthermore, a high current is applied during the period from the time at which the shutter blades start to close to the time at which the shutter is fully closed, and a low current is applied after the shutter is fully closed, whereby the movement of the shutter is stabilized, and re-exposure due to bouncing is prevented.

However, in the light control apparatus described in Japanese Patent Application Laid-Open No. 2007-25357, the shutter is always driven by a constant drive current in the shutter operation. In consequence, if the drive current required to drive the shutter changes due to influences of the condition in the environment such as the temperature or humidity or due to a deterioration of a coil or magnet with time, the shutter cannot operate stably.

SUMMARY OF THE INVENTION

The present invention has been made in view of the above-described problem, and has an object to drive a light control member stably irrespective of the position and state of the light control member.

To solve the above-described problem and to achieve the above object, the present invention provides a control method for a light control apparatus comprising, a drive step of moving a light control member from a first position to a second position and from the second position to the first position by a drive source, a detection step of detecting the position and state of the light control member, and a drive signal application step of applying a desired drive signal to the drive source in accordance with the position or state of the light control member detected in the detection step.

In the control method for a light control apparatus according to the present invention, it is preferred that at least one of an operation state during movement from the first position to the second position or from the second position to the first position and a positional state in which the light control member stays stationary be detected in the detection step.

In the control method for a light control apparatus according to the present invention, it is preferred that the operation state include a first operation state that continues from the start of application of the drive signal to the drive source to the start of movement of the light control member and a second operation state that continues from the start of movement of the light control member to the stop of the light control member at a specific position, and a first drive signal be applied in the first operation state, and a second drive signal be applied in the second operation state.

In the control method for a light control apparatus according to the present invention, it is preferred that in the case where $Ta1 \leq Tb1$, the intensity of the first drive signal be maintained or decreased, after $Ta1$ has elapsed since the start of application of the first drive signal to the drive source, and in the case where $Tb1 < Ta1$, the intensity of the first drive signal be increased, after $Tb1$ has elapsed since the start of application of the first drive signal to the drive source, where $Ta1$ is the time taken until the light control member starts to move in the first operation state, and $Tb1$ is a set time taken until the light control member starts to move in the first operation state.

It is preferred that the control method for a light control apparatus according the present invention further comprise a storing step of storing the intensity of the first drive signal after it has been increased, maintained, or decreased, in a memory apparatus.

In the control method for a light control apparatus according to the present invention, it is preferred that in the case where $Ta2 \leq Tb2$, the intensity of the second drive signal be maintained or decreased, after $Ta2$ has elapsed since the start of movement of the light control member, and in the case where $Tb2 < Ta2$, the intensity of the second drive signal be increased, after $Tb2$ has elapsed since the start of movement of the light control member, where $Ta2$ is the time taken until the light control member stops at the specific position in the second operation state, and $Tb2$ is a set time taken until the light control member stops at the specific position in the second operation state.

It is preferred that the control method for a light control apparatus according the present invention further comprise a storing step of storing the intensity of the second drive signal after it has been increased, maintained, or decreased, in a memory apparatus.

In the control method for a light control apparatus according to the present invention, it is preferred that if the light control member stops at a position other than the specific position in the second operation state, the intensity of the second drive signal applied to the drive source be increased to move the light control member to the specific position, and thereafter the intensity of the drive signal be decreased, or the drive signal is turned off.

In the control method for a light control apparatus according to the present invention, it is preferred that the positional state of the light control member include a first positional state in which the light control member stays stationary at the time when power supply to the light control apparatus is turned on and a second positional state in which the light control member has moved to the specific position and stays stationary thereat, at least one of the first positional state and the second positional state be detected in the detection step, and a desired drive signal be applied to the drive source in accordance with the detected state.

In the control method for a light control apparatus according to the present invention, it is preferred that if the light control member is not located at the specific position in the first positional state, the drive signal that causes the light control member to move to the specific position be applied to the drive source.

In the control method for a light control apparatus according to the present invention, it is preferred that if the light control member is not located at the specific position in the second positional state, the drive signal that causes the light control member to move to the specific position be applied to the drive source.

In the control method for a light control apparatus according to the present invention, it is preferred that the light control member be provided with a rotary shaft having magnetic properties, the drive source be an electromagnetic drive source having a yoke and a coil wound thereon, and the rotary shaft be rotated by the application of the drive signal to the drive source, whereby the light control member be swung to move from the first position to the second position or from the second position to the first position.

In the control method for a light control apparatus according to the present invention, it is preferred that the light control member be restrained to either the first position or the second position by a restraining member, and the detection in the detection step be performed by a contact sensor provided on at least one of the light control member and the restraining member.

In the control method for a light control apparatus according to the present invention, it is preferred that the detection in the detection step be performed by a light detector that measures the quantity of light passing through the light control member.

In the control method for a light control apparatus according to the present invention, it is preferred that the detection in the detection step be performed by a magnetic sensor, which detects a change in a magnetic field caused by displacement of the light control member made of a magnetic material, or a change in a magnetic field caused by rotation of the rotary shaft having magnetic properties provided on the light control member.

In the control method for a light control apparatus according to the present invention, it is preferred that the drive source that causes the light control member to move comprise a coil, and the magnetic sensor detect a change in the magnetic field caused by rotation of the rotary shaft having magnetic properties provided on the light control member by means of the coil.

A light control apparatus according to the present invention comprises a light control member, a drive source that causes the light control member to move, a restraining member that restrains the light control member to a first position and a second position, a detector that detects the position or state of the light control member, wherein the light control member is moved from the first position to the second position and from the second position to the first position by the drive source, and a desired drive signal is applied to the drive source in accordance with the position or state of the light control member detected by the detector.

In the light control apparatus according to the present invention, it is preferred that the light control member be provided with a rotary shaft having magnetic properties, the drive source be an electromagnetic drive source having a yoke and a coil wound thereon, and the rotary shaft be rotated by the application of the drive signal to the drive source, whereby the light control member be swung to move from the first position to the second position or from the second position to the first position.

In the light control apparatus according to the present invention, it is preferred that the detector comprise a contact sensor provided at least one of the light control member and the restraining member.

In the light control apparatus according to the present invention, it is preferred that the detector comprise a light detector that measures the quantity of light passing through the light control apparatus.

In the light control apparatus according to the present invention, it is preferred that the detector comprise a magnetic sensor, which detects a change in a magnetic field caused by displacement of the light control member made of a magnetic material, or a change in a magnetic field caused by rotation of the rotary shaft having magnetic properties provided on the light control member.

In the light control apparatus according to the present invention, it is preferred that the drive source that causes the light control member to move comprise a coil, and the magnetic sensor detect a change in the magnetic field caused by rotation of the rotary shaft having magnetic properties provided on the light control member by means of the coil.

In the light control apparatus according to the present invention, it is preferred that the light control member be provided with an aperture.

In the light control apparatus according to the present invention, it is preferred that the light control member be provided with an optical lens.

In the light control apparatus according to the present invention, it is preferred that the light control means be provided with an optical filter.

BRIEF DESCRIPTION OF THE DRAWINGS

FIGS. 2A and 2B are plan views illustrating the operation of a light control member according to the first embodiment, where FIG. 2A shows the state in which the light control member is located at a first position, and FIG. 2B shows the state in which the light control member is located at a second position;

FIG. 3A shows an electromotive force induced in a restraining portion, FIG. 3B shows an electromotive force induced in another restraining portion, and FIG. 3C shows a drive signal for driving the light control member;

FIG. 4A shows an electromotive force induced in the restraining portion, FIG. 4B shows an electromotive force induced in the other restraining portion, and FIG. 4C shows a drive signal for driving the light control member;

FIG. 10A shows a state in which a light control member according to a fourth embodiment is detached from a restraining portion at the time when the power supply is turned on;

DETAILED DESCRIPTION OF THE INVENTION

In the following, embodiments of the light control apparatus and the control method therefore according to the present invention will be described with reference to the accompanying drawings. It should be understood that the present invention is not limited to the embodiments.

First Embodiment

Figure 1:
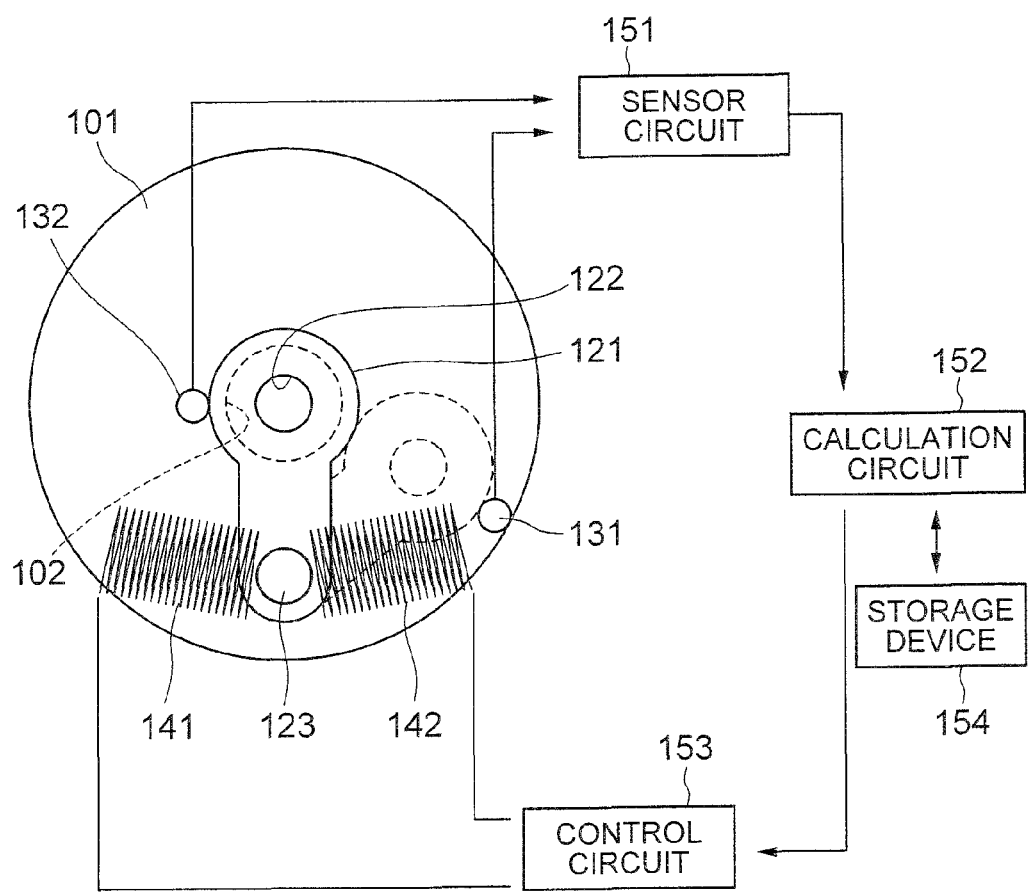
FIG. 1 is a diagram showing the configuration of a light control apparatus according to a first embodiment.

In the following, a light control apparatus according to a first embodiment of the present invention will be described with reference to FIGS. 1, 2A, 2B, 3A, 3B, 3C, 4A, 4B, 4C, 5A, and 5B. FIG. 1 shows the configuration of a light control apparatus 100 according to the first embodiment. The structure of the light control apparatus 100 and the operation thereof will be described with reference to FIG. 1.

The light control apparatus 100 includes a substrate 101, a light control member 121 (stop blade), restraining portions 131 and 132, electromagnetic drive sources 141 and 142, a sensor circuit 151, a calculation circuit 152, a control circuit 153, and a storage device 154.

The disk-like substrate 101 has an optical aperture 102 that is circular in the plan view. The light control member 121 has an optical aperture 122 that is circular in the plan view and a rotary shaft 123. The restraining portions 131 and 132 restrain the light control member 121 respectively at the first and second position as desired.

The light control member 121 is caused by the electromagnetic drive sources 141, 142 (e.g. coils) to swing about the rotary shaft 123. Specifically, the rotary shaft 123 is made of a material having magnetic properties, and is rotated by the magnetic force generated by the electromagnetic drive sources 141, 142. The light control member 121 thus swung eventually abuts the restraining portion 131 or the restraining portion 132 to thereby be positioned at either the first position or the second position as desired. In other words, the light control member 121 is moved from the first position to the second position or from the second position to the first position.

Next, the driving system of the light control apparatus 100 will be described. The driving system of the light control apparatus 100 includes a sensor that detects the position and state of the light control member 121, the sensor circuit 151 (detector) connected to the sensor, the calculation circuit 152 that makes a comparison between information output from the sensor circuit 151 and set information, the control circuit 153 that applies drive signals to the electromagnetic drive sources 141, 142 based on information output from the calculation circuit 152, and the storage device 154 that stores a driving condition for the light control member 121 output from the calculation circuit 152.

One method of detecting the position and state of the light control member 121 is, for example, to provide contact sensors (e.g. piezoelectric elements or a capacitive sensors) (detector) on at least one of the light control member 121 and the restraining portions 131, 132, to detect the contact of the sensor and the light control member 121 by the sensor circuit 151 connected to the sensors.

There are other methods of detection. For example, the position and state of the light control member may be detected by sensing, using a light sensor, changes in the quantity of light passing through the optical aperture 102a and incident on an image pickup element (not shown) caused by the displacement of the light control member 121, or the state of the light control member 121 may be detected based on the brightness of the image picked up by the image pickup element.

Alternatively, the state of the light control member may be detected by sensing, using a magnetic sensor (e.g. a coil or a hall-effect device), the magnetic field generated by the rotary shaft 123 having magnetic properties, or changes in the magnetic field caused by rotation of the rotary shaft 123, or by displacement of the light control member 121 in the case where the light control member 121 has magnetic properties.

In the following, a case in which contact sensors are provided on the restraining portions 131 and 132 to detect the position and state of the light control member 121 will be described with reference to FIGS. 2A, 2B, 3A, 3B, and 3C. FIGS. 2A and 2B are plan views illustrating the operation of the light control member 121 according to the first embodiment. FIG. 2A shows the state in which the light control member 121 is located at the first position, and FIG. 2B shows the state in which the light control member 121 is located at the second position.

In the light control apparatus 100, the position of the light control member 121 at which it abuts the restraining portion 131 and is kept away from the optical aperture 102 as shown in FIG. 2A is referred to as the first position. In the state in which the light control member 121 is located at the first position, the optical aperture of the light control apparatus 100 is defined by the optical aperture 102 provided on the substrate 101.

On the other hand, the position of the light control member 121 at which it abuts the restraining portion 132 and the centers of the optical aperture 102 and the optical aperture 122 are aligned with each other as shown in FIG. 2B is referred to as the second position. In the state in which the light control member 121 is located at the second position, the optical aperture of the light control apparatus 100 is defined by the optical aperture 122 provided on the light control member 121.

The light control member 121 is moved to the first position or the second position in accordance with the direction (or polarity) of the drive signal applied to the electromagnetic drive sources 141, 142.

Figure 3A:
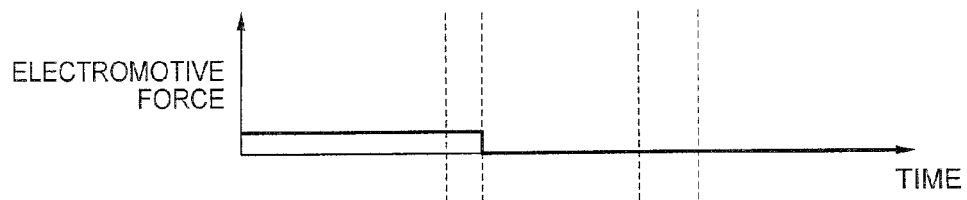
FIGS. 3A, 3B and 3C are graphs showing relevant waveforms in the period during the displacement of the light control member according to the first embodiment from the first position to the second position, where
Figure 3B:
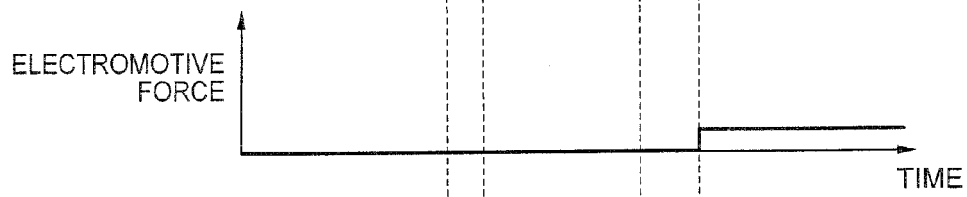
Figure 3C:
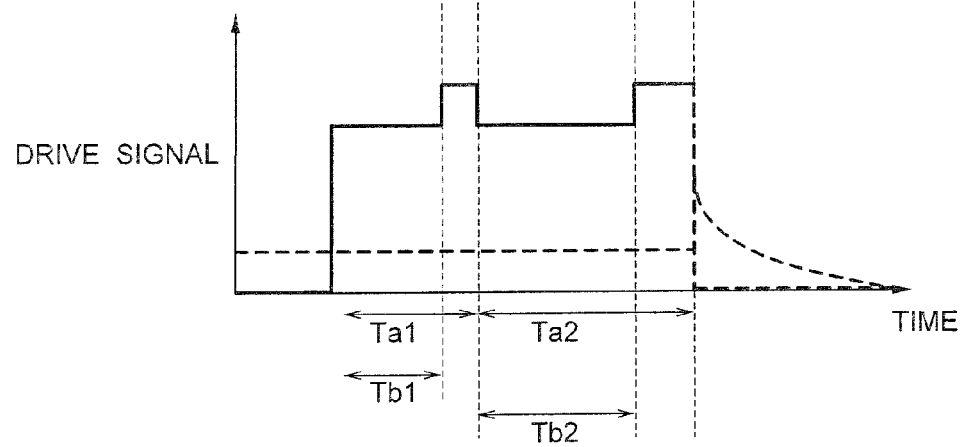

In the following, the driving of the light control member 121 will be described with reference to FIGS. 3A, 3B, and 3C. In this exemplary case, the state of the light control member 121 is detected based on time information. FIGS. 3A, 3B, and 3C are graphs showing relevant waveforms in the period during the displacement of the light control member 121 from the first position to the second position. FIG. 3A shows an electromotive force induced in the contact sensor provided on the restraining portion 131 (which will be hereinafter referred to as the electromotive force induced in the restraining portion 131 in some cases), FIG. 3B shows an electromotive force induced in the contact sensor provided on the restraining portion 132 (which will be hereinafter referred to as the electromotive force induced in the restraining portion 132 in some cases), and FIG. 3C shows a drive signal for driving the light control member 121. FIGS. 3A, 3B, and 3C show the waveforms in a case in which Tb1<Ta1 and Tb2<Ta2 are met.

Here, Ta1 represents the actual time taken from the start of the supply of current to the electromagnetic drive sources 141, 142 to the start of the displacement of the light control member 121, Tb1 represents a set time taken from the start of the supply of current to the electromagnetic drive sources 141, 142 to the start of the displacement of the light control member 121, Ta2 represents the actual time taken from the start of the displacement of the light control member 121 until the light control member 121 abuts the restraining portion 132 to stop, and Tb2 represents a set time taken from the start of the displacement of the light control member 121 until the light control member 121 abuts the restraining portion 132 to stop.

In FIGS. 3A, 3B, and 3C, waveforms are shown for the case in which the light control member 121 is moved from the first position to the second position by the electromagnetic drive sources 141, 142. The case in which the light control member 121 is moved from the second position to the first position may be understood in a similar way.

As shown in FIGS. 2A, 3A, 3B, and 3C, the light control member 121 is in contact with the restraining portion 131 before the application of a drive signal to the electromagnetic drive source 141, and an electromotive force is induced in the contact sensor provided on the restraining portion 131 as long as the contact is maintained. On the other hand, as shown in FIGS. 2B, 3A, 3B, and 3C, when the light control member 121 is in contact with the restraining portion 132, an electromotive force is induced in the contact sensor provided on the restraining portion 132. While the light control member 121 is moving, no electromotive force is induced in the contact sensors provided on the restraining portions 131, 132.

As shown in FIGS. 3A, 3B, and 3C, if Tb1<Ta1, the intensity of the drive signal applied to the electromagnetic drive sources 141, 142 is made higher until the light control member 121 starts to move; if Tb2<Ta2, the intensity of the drive signal applied to the electromagnetic drive sources 141 and 142 is made higher until the light control member 121 abuts the restraining portion 132 to stop.

At the time when the light control member 121 abuts the restraining portion 132 to stop and the generation of the electromotive force in the restraining portion 132 is detected, the intensity of the drive signals applied to the electromagnetic drive sources 141 and 142 is made lower or the application of the drive signals is stopped.

However, if the light control member 121 bounces or moves due to an impact upon the contact or other causes after the contact with the restraining portion 132, the light control member 121 will be detached from the restraining portion 132 and the electromotive force will not be induced. Therefore, it is preferred that the drive signal for moving the light control member 121 to the second position continue to be applied even after the light control member 121 has come in contact with the restraining portion 132. In connection with the above, it should be understood that an increase in the intensity of the drive signal (driving current) applied to the electromagnetic drive sources 141 and 142 leads to an increase in the driving force of the light control member 121.

Figure 4A:
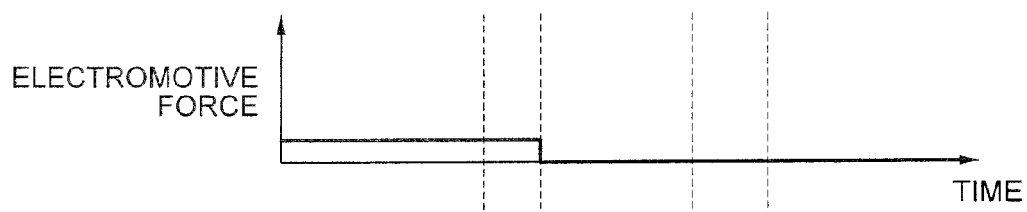
FIGS. 4A, 4B, and 4C are graphs showing relevant waveforms in the period during the displacement of the light control member according to the first embodiment from the first position to the second position, where
Figure 4B:
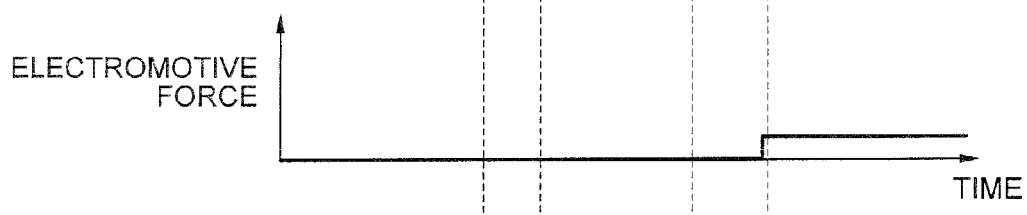
Figure 4C:
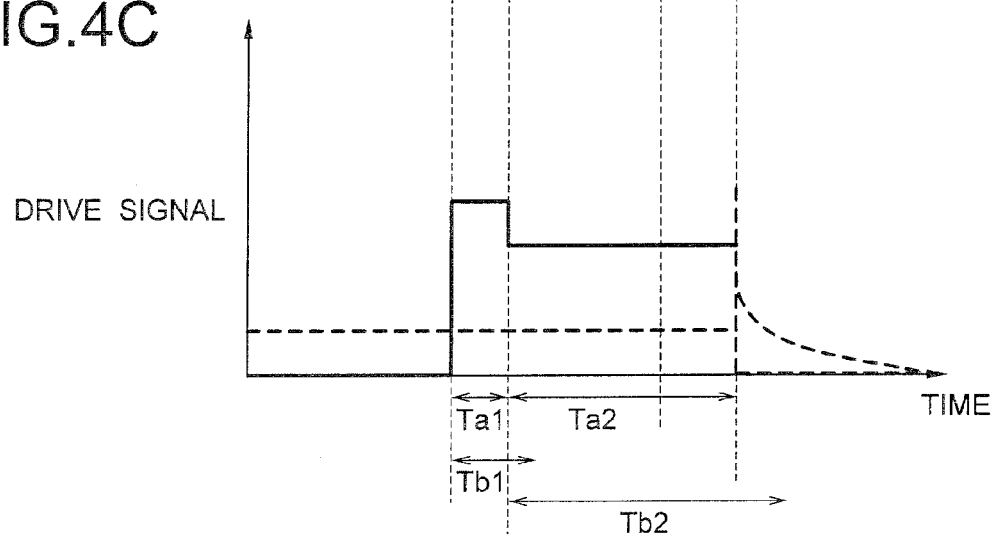

On the other hand, as shown in FIGS. 4A, 4B, and 4C, if Ta1≦Tb1, the intensity of the drive signal applied to the electromagnetic drive sources 141, 142 is kept unchanged or made lower when the light control member 121 starts to move; if Ta2≦Tb2, the intensity of the drive signals applied to the electromagnetic drive sources 141 and 142 is kept unchanged or is made lower until the light control member 121 abuts the restraining portion 132 to stop.

FIGS. 4A, 4B, and 4C are graphs showing relevant waveforms in the period during the displacement of the light control member 121 from the first position to the second position. FIG. 4A shows an electromotive force induced in the restraining portion 131, FIG. 4B shows an electromotive force induced in the restraining portion 132, and FIG. 4C shows a drive signal for driving the light control member 121. FIGS. 4A, 4B, and 4C show the waveforms in the case in which Ta1≦Tb1 and Ta2≦Tb2 are met.

In the case shown in FIGS. 4A, 4B, and 4C, as with the case shown in FIGS. 3A, 3b, and 3C, it is preferred that the intensity of the drive signal applied to the electromagnetic drive sources is made lower or the drive signal is turned off at the time when it is detected that the light control member 121 stops. However, if the light control member 121 bounces or moves due to an impact or other causes, the light control member 121 will be detached from the restraining portion 132 and the electromotive force will not be induced. Therefore, it is preferred that a drive signal for moving the light control member 121 to the second position continue to be applied even after the light control member 121 has come in contact with the restraining portion 132.

In the light control apparatus 100 according to the first embodiment, the contact sensors are provided on the restraining portions 131 and 132 respectively to detect the position and state (position state) of the light control member 121. Thus, the drive signal suitable for the position and state of the light control member 121 can be applied, and the light control member 121 can reliably be stopped at the predetermined position (i.e. the first position or the second position).

For example, as shown in FIGS. 3A, 3B, and 3C, if the actual time Ta1 taken until the start of the displacement of the light control member 121 and the actual time Ta2 taken from the start of the displacement of the light control member 121 to the stop of the displacement thereof are longer than the set times Tb1 and Tb2 respectively, the intensity of the drive signal is made higher to displace the light control member 121 to the predetermined position without fail. On the other hand, as shown in FIGS. 4A, 4B, and 4C, if the actual time Ta1 taken until the start of the displacement of the light control member 121 and the actual time Ta2 taken from the start of the displacement of the light control member 121 to the stop of the displacement thereof are shorter than the set times Tb1 and Tb2 respectively, the intensity of the drive signal is kept unchanged or made lower, and therefore, it is not necessary to apply a useless drive signal, and the electric power consumption can be reduced.

Figure 5A:
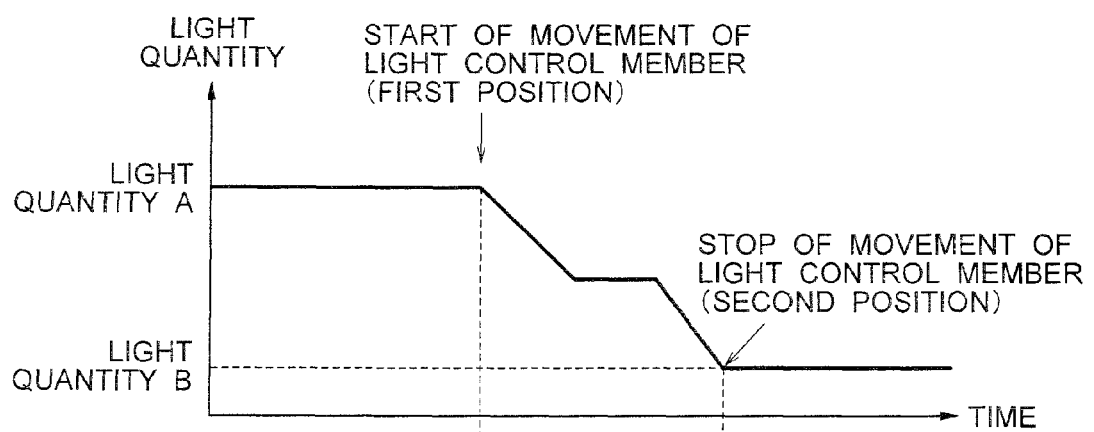
FIG. 5A is a graph showing changes in the quantity of light passing through the light control apparatus during the displacement of the light control member according to the first embodiment from the first position to the second position.
Figure 5B:
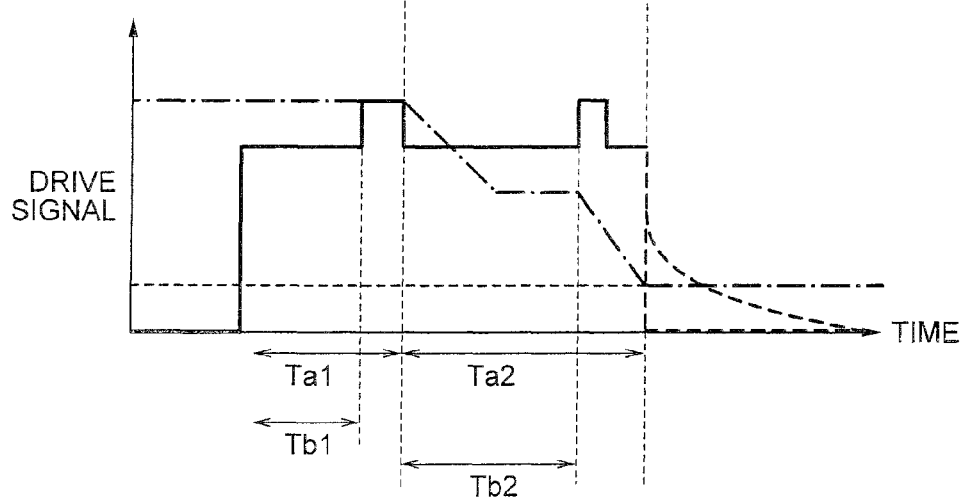
FIG. 5B is a graph showing a drive signal for driving the light control member.

In the case shown in FIGS. 3A, 3B, and 3C, the contact sensors provided on the restraining portions 131, 132 are used as detectors, and the detection is performed based on time information. However, the detection may be performed using other detectors or detection means. For example, as shown in FIGS. 5A and 5B, the same effect can be achieved by performing the detection based on the quantity of light passing through the light control apparatus. Alternatively, a storage device 154 may be used to store driving information necessary for the operation (e.g. the applied drive signal, and/or operation times Ta1 and Ta2), and the drive signal used in the subsequent operation may be determined based on this information.

Here, a case in which the detection is performed based on the quantity of light passing through the light control apparatus will be described with reference to FIGS. 5A and 5B. FIG. 5A is a graph showing changes in the quantity of light passing through the light control apparatus 100 during the displacement of the light control member 121 from the first position to the second position, and FIG. 5B is a graph showing a drive signal for driving the light control member 121. FIGS. 5A and 5B show the waveforms in a case in which Tb1<Ta1 and Tb2<Ta2 are met.

In FIG. 5A, the quantity of light passing through the light control apparatus in the state in which the light control member 121 is located at the first position is referred to as LIGHT QUANTITY A, and the quantity of light passing through the light control apparatus in the state in which the light control member 121 is located at the second position is referred to as LIGHT QUANTITY B.

In the case shown in FIGS. 5A and 5B, if Tb1<Ta1, the intensity of the drive signal applied to the electromagnetic drive sources is made higher until the light control member 121 starts to move, and if Tb2<Ta2, the drive signal is made higher.

For example, in the case shown in FIGS. 5A and 5B, even if the light control member 121 is stopped due to a certain disturbance before reaching the second position during the displacement from the first position to the second position, namely, even if the light quantity stops to change, the intensity of the applied drive signal is made higher. In consequence, the light control member 121 can eventually be moved to the second position without fail.

In the light control apparatus 100 according to the first embodiment, the intensity of the drive signal is made higher or lower based on the comparison of the actual time taken in the displacement of the light control member 121 and the set time. Alternatively, for example, information on the position of the light control member 121 may be checked, and the intensity of the drive signal may be made higher when it is recognized that the light control member 121 has been stopped at a position other than the first or second position during the displacement.

Second Embodiment

Figure 6:
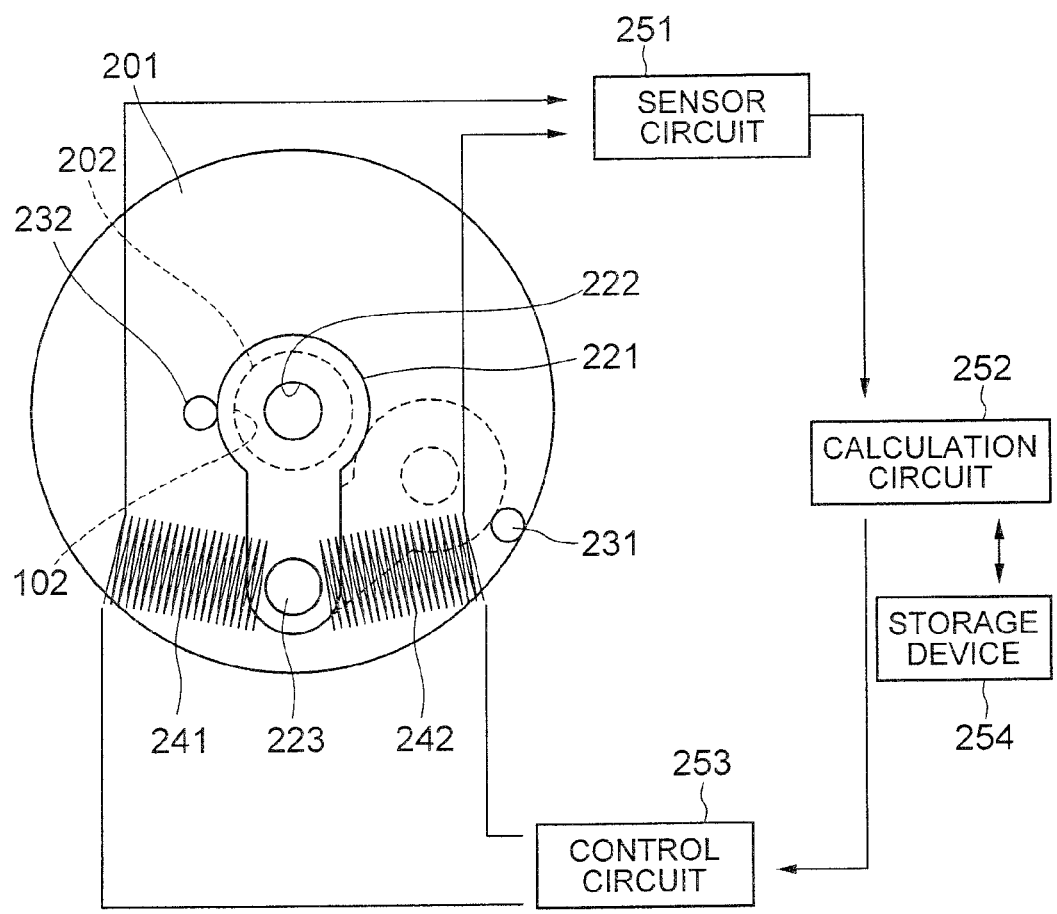
FIG. 6 shows the configuration of a light control apparatus according to a second embodiment.

Next, a light control apparatus 200 according to a second embodiment will be described with reference to FIGS. 6, 7A, 7B, and 7C. FIG. 6 shows the configuration of the light control apparatus 200 according to the second embodiment.

The light control member 200 according to the second embodiment differs from the light control member 100 according to the first embodiment in that electromagnetic drive sources 241, 242 are used as detectors instead of the contact sensors provided on the restraining portions 131, 132 in the first embodiment, and in that a pulsed drive signal is used. In the other respects, the configuration of the light control apparatus 200 according to the second embodiment is the same as that of the light control apparatus 100 according to the first embodiment. The light control apparatus 200 according to the second embodiment has a substrate 201, an optical aperture 202, a light control member 221 (stop blade), an optical aperture 222, a rotary shaft 223, restraining portions 231 and 232, a calculation circuit 252, a control circuit 253, and a storage device 254 that are equivalent respectively to the substrate 101, the optical aperture 102, the light control member 121 (stop blade), the optical aperture 122, the rotary shaft 123, the restraining portions 131 and 132, the calculation circuit 152, the control circuit 153, and the storage device 154 according to the first embodiment.

In the light control apparatus 200, the electromagnetic drive sources 241, 242 are used as detectors for detecting the position and state of the light control member 221. The electromagnetic drive sources 241, 242 output the result of the detection to a sensor circuit 251.

When the rotary shaft 223 having magnetic properties is rotated to swing the light control member 221, the magnetic field around the rotary shaft 223 changes. In consequence, an electromotive force is induced, with the change in the magnetic field, in the electromagnetic drive source 241 and the electromagnetic drive source 242 opposed to each other with the rotary shaft 223 between. In the light control apparatus 200 according to the second embodiment, the state of the light control member 221 is detected by sensing the electromotive force induced in the electromagnetic drive sources 241, 242 with the change in the magnetic field.

Figure 7A:
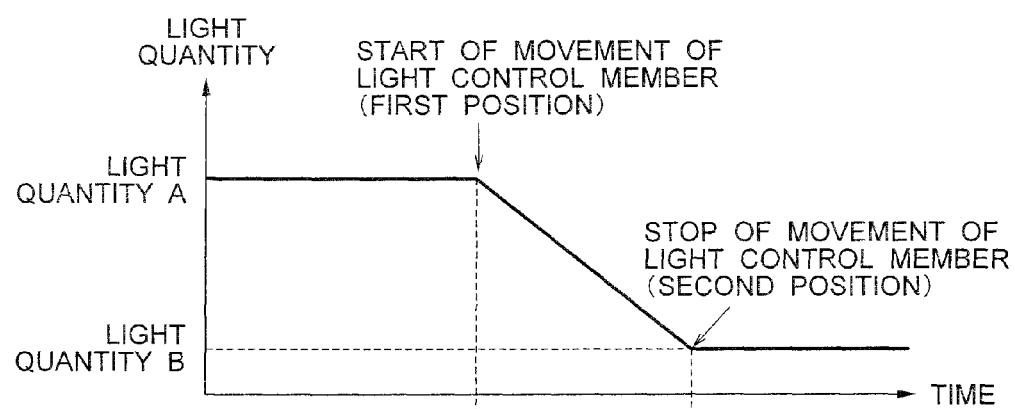
FIG. 7A is a graph showing changes in the quantity of light passing through the light control apparatus during the displacement of a light control member according to a second embodiment from the first position to the second position.
Figure 7B:
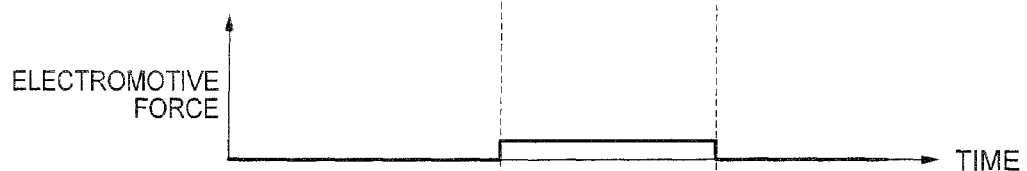
FIG. 7B is a graph showing changes in the electromotive force induced in electromagnetic drive sources with the swing of the light control member.
Figure 7C:
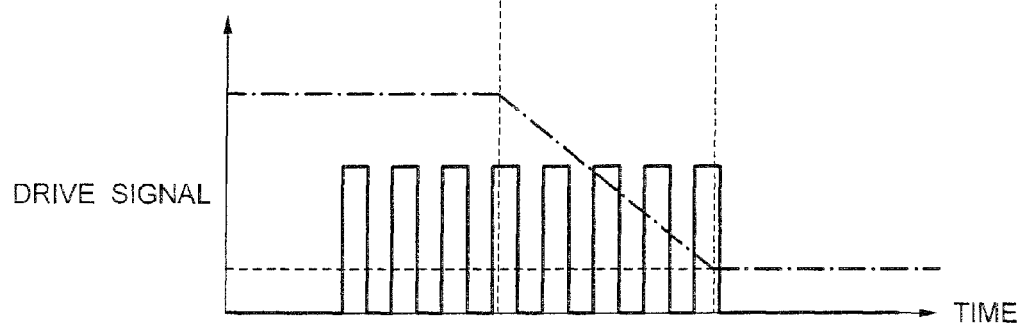
FIG. 7C is a graph showing a drive signal for driving the light control member.

Next, the driving of the light control member 221 according to the second embodiment will be described with reference to FIGS. 7A, 7B, and 7C. FIG. 7A is a graph showing changes in the quantity of light passing through the light control apparatus 200 during the displacement of the light control member 221 from the first position to the second position, FIG. 7B is a graph showing changes in the electromotive force induced in the electromagnetic drive sources 241, 242 with the swing of the light control member 221, and FIG. 7C is a graph showing a drive signal for driving the light control member 221. In FIGS. 7A, 7B, and 7C, the graph showing changes in the quantity of light is also presented to facilitate the understanding of the motion of the light control member 221, and the electromotive force induced in the electromagnetic drive sources 241, 242 is illustrated in a schematic manner.

As shown in FIGS. 7A, 7B, and 7C, as the light control member 221 starts to move with the application of the drive signal, an electromotive force is induced in the electromagnetic drive sources 241, 242 with the rotation of the rotary shaft 223 having magnetic properties. During the rotation of the rotary shaft 223, or during the displacement of the light control member 221, the electromotive force is induced continuously. When the light control member 221 comes to the second position, it abuts the restraining portion 232 to stop. Since the rotation of the rotary shaft 223 also stops at this time, the electromotive force becomes zero. The drive signal is turned off at this time.

If the light control member 221 bounces or moves due to an impact or other causes, the rotary shaft 223 will rotate, whereby an electromotive force will be induced. If the electromotive force is induced in this way, it is preferred that a drive signal for moving the light control member 221 to the second position be applied again.

In the light control apparatus 200, the drive signal is applied intermittently. In other words, a pulsed drive signal is applied. The reason for this is as follows.

In the case where the electromotive force induced in the electromagnetic drive sources 241, 242 is very small in comparison with the voltage of the drive signal applied to the electromagnetic drive sources 241, 242, it is difficult to detect the electromotive force induced in the electromagnetic drive sources 241, 242 if the drive signal is applied continuously to the electromagnetic drive sources 241, 242. Therefore, an intermittent driving signal is employed as the signal applied to the electromagnetic drive sources 241, 242, whereby a weak electromotive force induced in the electromagnetic drive sources 241, 242 can be detected in the periods during which the driving signal is not applied.

In this light control apparatus 200, as with the light control apparatus 100 according to the first embodiment, the light control member 221 can be displaced to the predetermined position with reliability by detecting the state of the light control member 221 during the driving thereof. In this connection, since the electromagnetic drive sources 241, 242 are used also as the detectors for detecting the position and state of the light control member 221, it is not necessary to provide additional detectors like the contact sensors in the light control apparatus 100.

In the case shown in FIGS. 7A, 7B, and 7C, the pulsed signal having a constant intensity and regular pulse widths is supplied. It is also possible to displace the light control member 221 to the predetermined position with reliability by increasing or decreasing the intensity of the drive signal, or by increasing or decreasing the pulse width based on times Ta1, Tb1, Ta2, and Tb2, as with the case of the light control apparatus 100. It should be understood that an increase in the intensity of the drive signal (driving current) leads to an increase in the driving force of the light control member 221. Alternatively, as with the case of the light control apparatus 100, a storage device 254 may be used to store driving information necessary for the operation (e.g. applied drive signals, and/or operation times Ta1 and Ta2), and the drive signals used in the subsequent operation may be determined based on this information.

The configuration, operation, and advantages of the apparatus according to this embodiment other than those described above are the same as those of the apparatus according to the first embodiment.

Third Embodiment

In the following, a light control apparatus 300 according to a third embodiment will be described with reference to FIGS. 8A, 8B, 8C, 9A, 9B, and 9C.

The configuration of the light control apparatus 300 according to the third embodiment is the same as that of the light control apparatus 100 according to the first embodiment. The light control apparatus 300 according to the third embodiment has a substrate 301, an optical aperture 302, a light control member 321 (stop blade), an optical aperture 322, a rotary shaft 323, restraining portions 331 and 332, and electromagnetic drive sources 341 and 342 that are equivalent respectively to the substrate 101, the optical aperture 102, the light control member 121, the optical aperture 122, the rotary shaft 123, the restraining portions 131 and 132, and the electromagnetic drive sources 141 and 142 in the apparatus according to the first embodiment. The configuration or the components of the light control apparatus 300 according to the third embodiment other than those described above are also the same as those of the light control apparatus 100 according to the first embodiment, and they are not shown in the drawings.

In the light control apparatus 300, contact sensors serving as detectors are provided on the light control member 321, or the restraining portions 331 and 332 in the same manner as in the light control apparatus 100 according to the first embodiment.

The light control apparatus 300 according to the third embodiment differs from the light control apparatus 100 according to the first embodiment in that the position and state of the light control member 321 can be controlled in the state in which the light control member 321 has been moved to one of the predetermined position (i.e. the first position or the second position) and is left stationary at this position without being moved to the other position.

Figure 8A:
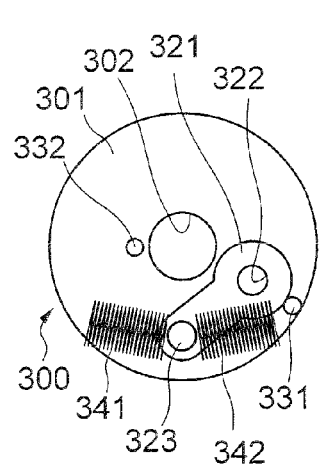
FIG. 8A shows a state in which a light control member according to a third embodiment is in contact with a restraining portion and is located at the first position.
Figure 8B:
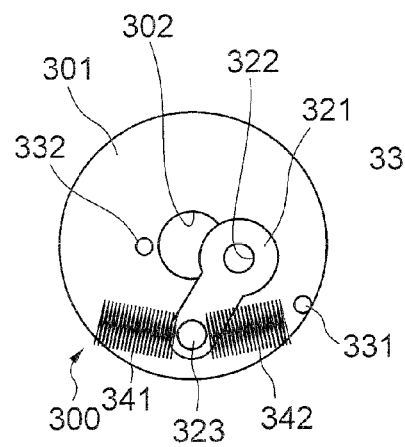
FIG. 8B shows a state in which the light control member is detached from the restraining portion.
Figure 8C:
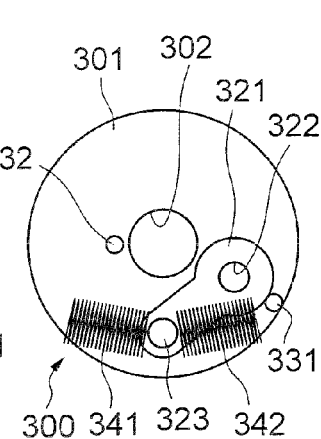
FIG. 8C shows a state in which the light control member is in contact with another restraining portion.
Figure 9A:
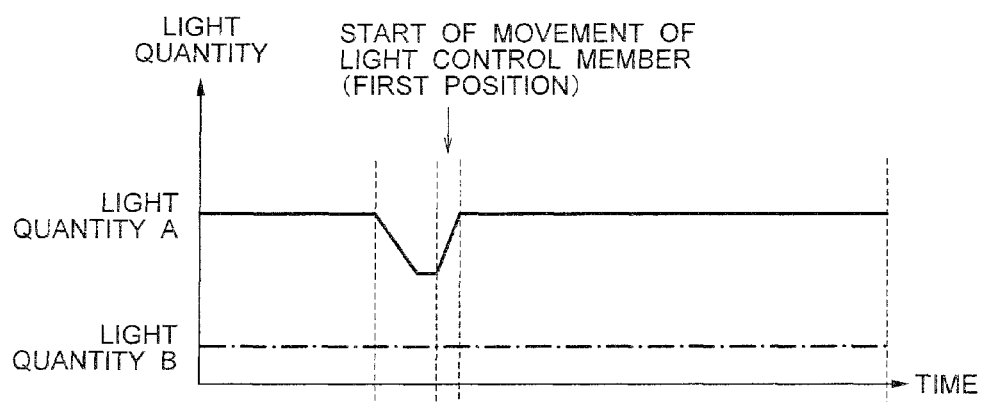
FIG. 9A is a graph showing changes in the quantity of light passing through the light control apparatus before, during, and after the period in which the light control member according to the third embodiment is detached from the restraining portion.

FIGS. 8A, 8B, and 8C are plan views illustrating the position and state of the light control member 321 according to the third embodiment. FIG. 8A shows the state in which the light control member 321 is in contact with the restraining portion 331 and is located at the first position, and FIG. 8B shows a state in which the light control member 321 has been detached from the restraining portion 331, and FIG. 8C shows the state in which the light control member 321 is in contact with the restraining portion 331. FIG. 9A is a graph showing changes in the quantity of light passing through the light control apparatus 300 before, during, and after the period in which the light control member 321 is detached from the restraining portion 331, FIG. 9B is a graph showing an electromotive force induced in the restraining portions 331, 332 before, during, and after the period in which the light control member 321 is detached from the restraining portion 331, and FIG. 9C is a graph showing a drive signal for driving the light control member 321.

The control of the position and state of the light control member 321 will be described.

Figure 9B:
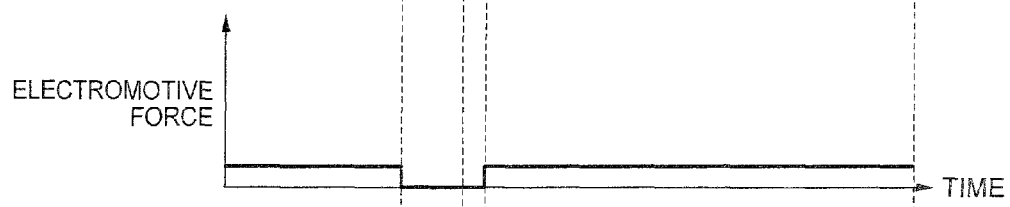
FIG. 9B is a graph showing an electromotive force induced in the restraining portions before, during, and after the period in which the light control member is detached from the restraining portion.
Figure 9C:
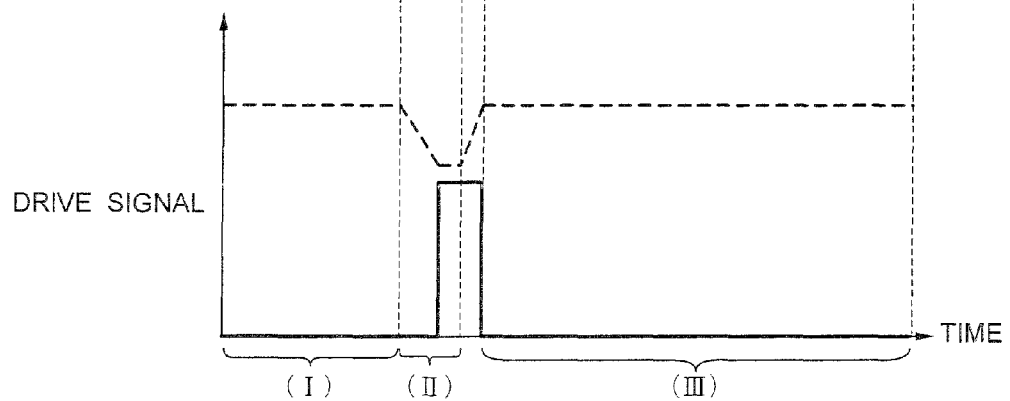
FIG. 9C is a graph showing a drive signal for driving the light control member.

In the state shown in FIG. 8A, the light control member 321 stays stationary at the first position (state (I) in FIGS. 9A, 9B, and 9C). In this state, a current for driving the light control member 321 is not supplied, or a low current for maintaining the position of the light control member 321 is supplied. The quantity of light passing through the light control apparatus 300 is at a certain level represented as LIGHT QUANTITY A in FIG. 9A. Since the light control member 321 is in contact with the restraining portion 331 in this state, an electromotive force is induced (FIG. 9B).

In the state shown in FIG. 8A, if, for example, a strong impact acts on the light adjust apparatus 300, the light control member 321 is moved and detached from the restraining portion 331 (FIG. 8B). In this state, the light control member 321 overlaps on a part of the optical aperture 302 of the substrate 301, whereby the quantity of light passing through the light control apparatus is decreased (state (II) in FIGS. 9A, 9B, and 9C). Since the light control member 321 is not in contact with the restraining portion 331 in this state, an electromotive force is not induced.

When the sensor circuit 151 detects that the state of the light control member 321 has changed, though no drive signal for driving the light control member 321 is applied, from the state in which the light control member 321 is located at the first position at which it is in contact with the restraining portion 331 to the state in which it is detached from the restraining portion 331 and no electromotive force is induced (FIG. 8B), the control circuit 153 applies a drive signal for returning the light control member 321 to the first position to the electromagnetic drive sources 341 and 342.

Thus, the light control member 321 is returned to the position at which it is in contact with the restraining portion 331 (state (III) in FIGS. 8C, 9A, 9B, and 9C). After the light control member 321 has moved to the first position and the electromotive force is induced again in the restraining portion 331, the drive signal is turned off or the intensity of the drive signal is decreased again.

With the above-described control, even if the light control member 321 is moved from the predetermined position due to an impact or other causes after having been moved to the first position or the desired position, the detector can detect that the light control member 321 is not located at the predetermined position, and the drive signal for returning the light control member 321 to the predetermined position can be applied.

This control can be performed in the same way after the light control member 321 has been moved to the second position.

The time over which the drive signal is applied and the quantity of current of the drive signal are controlled based on the amount of displacement of the light control member 321. Therefore, it is possible to move the light control member 321 to the predetermined position with reliability without applying a wasteful drive signal.

By performing the above-described detection and control, it is not necessary to constantly apply a signal having a high intensity in order to retain the light control member 321 at the predetermined position, whereby power saving is achieved.

The configuration, operation, and advantages of the apparatus according to this embodiment other than those described above are the same as those of the apparatus according to the first embodiment.

Fourth Embodiment

In the following, a light control apparatus 400 according to a fourth embodiment will be described with reference to FIGS. 10A, 10B, 11A, 11B, 11C, and 11D.

The configuration of the light control apparatus 400 according to the fourth embodiment is the same as that of the light control apparatus 100 according to the first embodiment. The light control apparatus 400 according to the fourth embodiment has a substrate 401, an optical aperture 402, a light control member 421 (stop blade), an optical aperture 422, a rotary shaft 423, restraining portions 431 and 432, and electromagnetic drive sources 441 and 442 that are equivalent respectively to the substrate 101, the optical aperture 102, the light control member 121, the optical aperture 122, the rotary shaft 123, the restraining portions 131 and 132, and the electromagnetic drive sources 141 and 142 in the apparatus according to the first embodiment. The configuration or the components of the light control apparatus 400 according to the fourth embodiment other than those described above are the same as those of the light control apparatus 100 according to the first embodiment, and they are not shown in the drawings.

In the light control apparatus 400, contact sensors serving as detectors are provided on the light control member 421, or on the restraining portions 431, 432 in the same manner as in the light control apparatus 100 according to the first embodiment.

The light control apparatus 400 according to the fourth embodiment differs from the light control apparatus 100 according to the first embodiment in that the state and position of the light control member 421 can be controlled at the time when the power supply is turned on.

Figure 10A:
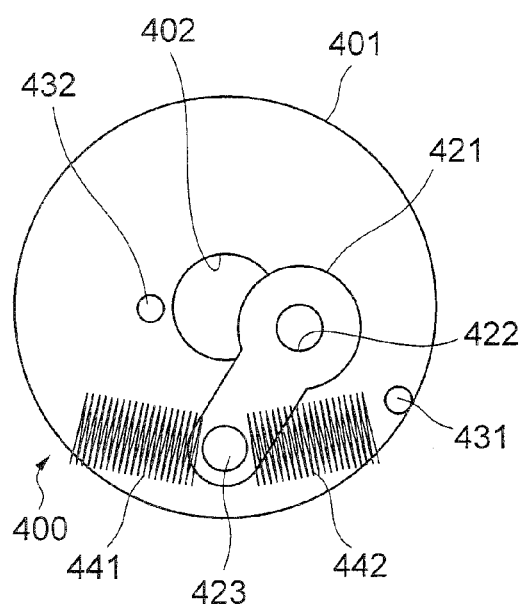
Figure 10B:
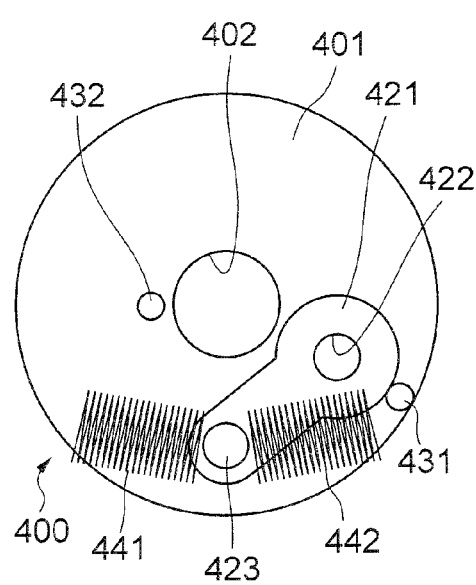
FIG. 10B shows a state in which the light control member is in contact the restraining portion.
Figure 11A:
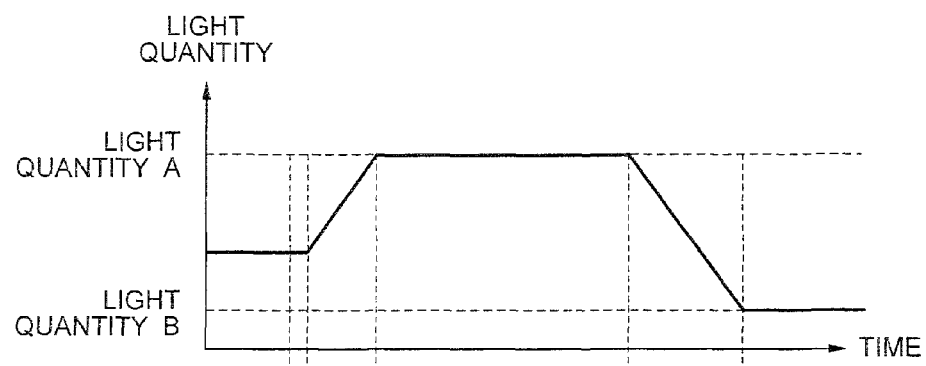
FIG. 11A is a graph showing changes in the quantity of light passing through the light control apparatus according to the fourth embodiment after the turning-on of the power supply.
Figure 11B:
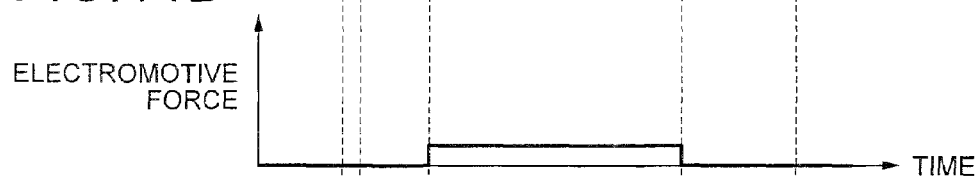
FIG. 11B is a graph showing an electromotive force induced in the restraining portion after the turning-on of the power supply.
Figure 11C:
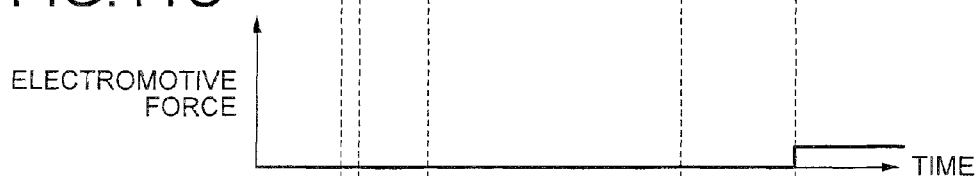
FIG. 11C is a graph showing an electromotive force induced in another restraining portion after the turning-on of the power supply.
Figure 11D:
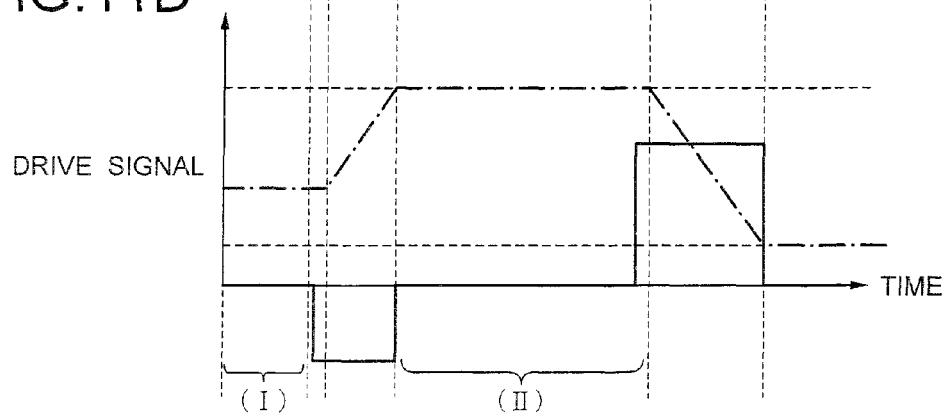
FIG. 11D is a graph showing a drive signal for driving the light control member.
Figure 12A:
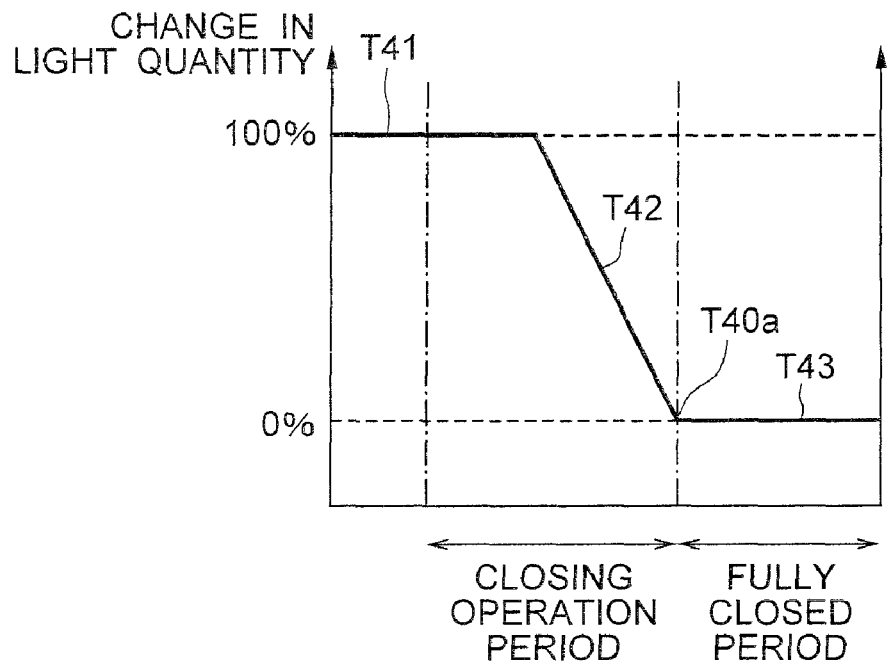
FIG. 12A is a graph showing changes in the quantity of light with time in a conventional light control apparatus.
Figure 12B:
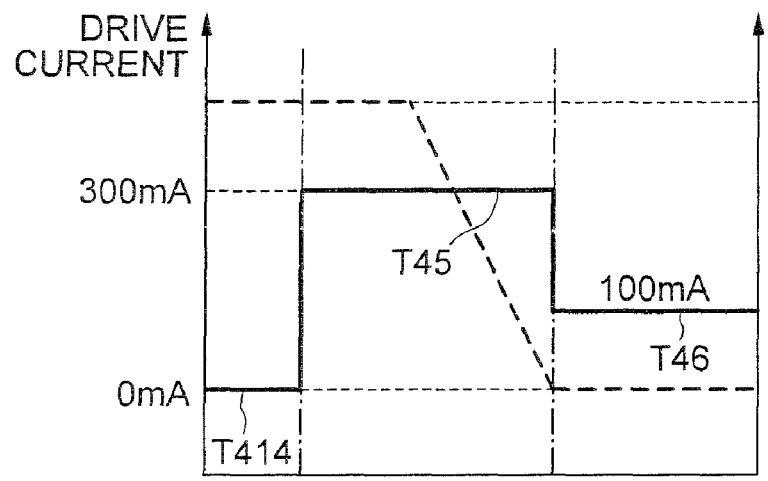
FIG. 12B is a graph showing changes in the drive current with time in the conventional light control apparatus.

FIGS. 10A and 10B are plan views illustrating the position and state of the light control apparatus 400 according to the fourth embodiment. FIG. 10A shows the state in which the light control member 421 is detached from the restraining portion 431 at the time when the power supply is turned on, and FIG. 10B shows the state in which the light control member 421 is in contact with the restraining portion 431. FIG. 11A is a graph showing changes in the quantity of light passing through the light control apparatus 400 after the turning-on of the power supply, FIG. 11B is a graph showing an electromotive force induced in the restraining portion 431 after the turning-on of the power supply, FIG. 11C is a graph showing an electromotive force induced in the restraining portion 432 after the turning-on of the power supply, and FIG. 11D is a graph showing a drive signal for driving the light control member 421.

The control of the position and state of the light control member 421 after the turning-on of the light control apparatus 400 will be described.

When the sensor circuit 151 detects that the light control member 421 is located at a position in which it is in contact with neither of the contact sensors provided on the restraining portions 431 and 432 at the time when the power supply to the light control apparatus 400 is turned on as shown in FIG. 10A (state (I) in FIGS. 11A, 11B, 11C, and 11D), the control circuit 153 applies a drive signal to the electromagnetic drive sources 441, 442 to move the light control member 421 to the first position (state (II) in FIGS. 10B, 11A, 11B, 11C, and 11D)

On the other hand, if the light control member 421 is initially located at the first position at the time when the power supply is turned on, the drive signal is not applied.

With the above described control, in the case in which the light control member 421 is not located at the predetermined position after the power supply to the light control apparatus 400 is turned on, the positional state of the light control member 421 is detected, and the drive signal for moving the light control member 421 to the predetermined position is applied, whereby the light control member 421 can be moved to the predetermined position.

The configuration, operation, and advantages of the apparatus according to this embodiment other than those described above are the same as those of the apparatus according to the first embodiment.

As described above, the light control apparatus according to the present invention can suitably be applied to the small size light control apparatus.

The control method for the light control apparatus, and the light control apparatus according to the present invention are advantageous in that the stop can be driven stably irrespective of the state and position of the light control member.

What is claimed is:

1. A control method for a light control apparatus comprising:

a drive step of moving a light control member from a first position to a second position and from the second position to the first position by a drive source;

a detection step of detecting the position and state of the light control member, at least one of an operation state during movement from the first position to the second position or from the second position to the first position and a positional state in which the light control member stays stationary being detected, the operation state including a first operation state that continues from the start of application of the drive signal to the drive source to the start of movement of the light control member and a second operation state that continues from the start of movement of the light control member to the stop of the light control member at a specific position; and a drive signal application step of applying a desired drive signal to the drive source in accordance with the position or state of the light control member detected in the detection step, a first drive signal being applied in the first operation state, and a second drive signal being applied in the second operation state.

2. The control method for a light control apparatus according to claim 1, wherein, let Ta1 be the time taken until the light control member starts to move in the first operation state, and let Tb1 be a set time taken until the light control member starts to move in the first operation state, in the case where $Ta1 \leqq Tb1$, the intensity of the first drive signal is maintained or decreased, after Ta1 has elapsed since the start of application of the first drive signal to the drive source, and in the case where $Tb1 < Ta1$, the intensity of the first drive signal is increased, after Tb1 has elapsed since the start of application of the first drive signal to the drive source.

3. The control method for a light control apparatus according to claim 2, further comprising a storing step of storing the intensity of the first drive signal after it has been increased, maintained, or decreased, in a memory apparatus.

4. The control method for a light control apparatus according to claim 1, wherein, let Ta2 be the time taken until the light control member stops at the specific position in the second operation state, and let Tb2 be a set time taken until the light control member stops at the specific position in the second operation state, in the case where $Ta2 \leqq Tb2$, the intensity of the second drive signal is maintained or decreased, after Ta2 has elapsed since the start of movement of the light control member, and in the case where $Tb2 < Ta2$, the intensity of the second drive signal is increased, after Tb2 has elapsed since the start of movement of the light control member.

5. The control method for a light control apparatus according to claim 4 further comprising a storing step of storing the intensity of the second drive signal after it has been increased, maintained, or decreased, in a memory apparatus.

6. The control method for a light control apparatus according to claim 1, wherein if the light control member stops at a position other than the specific position in the second operation state, the intensity of the second drive signal applied to the drive source is increased to move the light control member to the specific position, and thereafter the intensity of the drive signal is decreased, or the drive signal is turned off.

7. The control method for a light control apparatus according to claim 1, wherein the positional state of the light control member includes a first positional state in which the light control member stays stationary at the time when power supply to the light control apparatus is turned on and a second positional state in which the light control member has moved to the specific position and stays stationary thereat, at least one of the first positional state and the second positional state is detected in the detection step, and a desired drive signal is applied to the drive source in accordance with the detected state.

8. The control method for a light control apparatus according to claim 7, wherein if the light control member is not located at the specific position in the first positional state, the drive signal that causes the light control member to move to the specific position is applied to the drive source.

9. The control method for a light control apparatus according to claim 7, wherein if the light control member is not located at the specific position in the second positional state, the drive signal that causes the light control member to move to the specific position is applied to the drive source.

* * * * *